Jan. 5, 1954     H. R. BILLETER     2,664,643
CONNECTING ROD ALIGNMENT GAUGE
Filed June 20, 1952     3 Sheets-Sheet 2
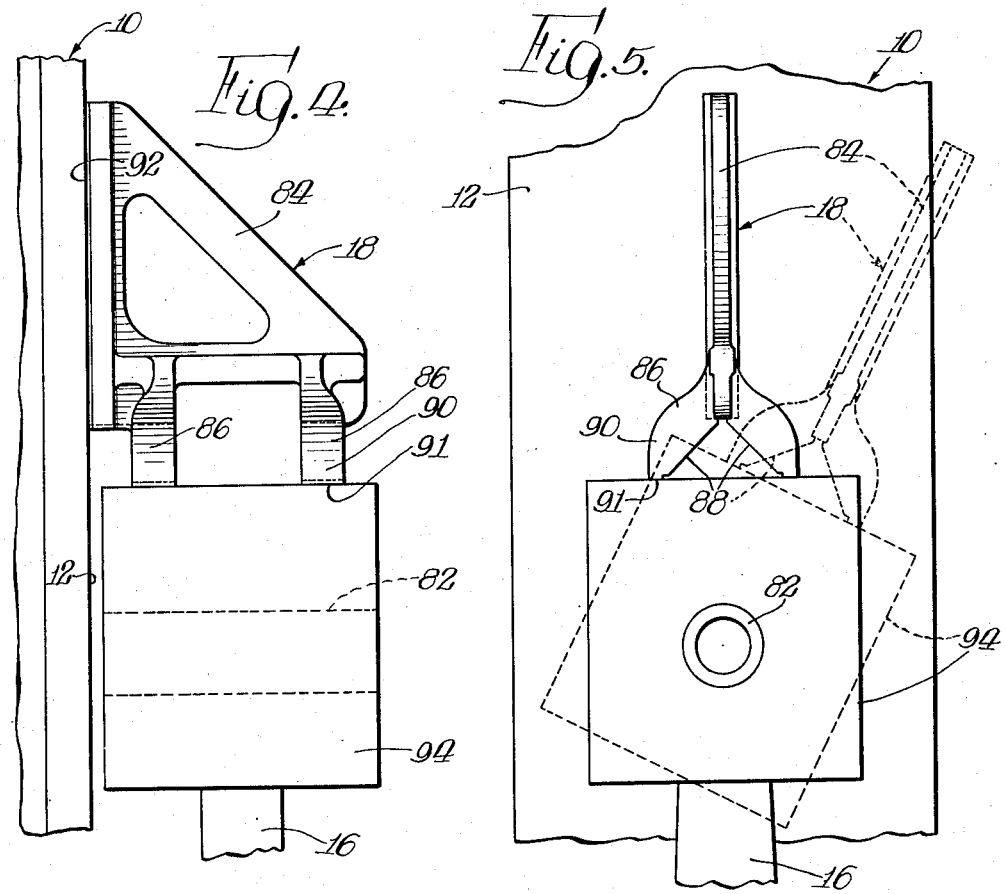
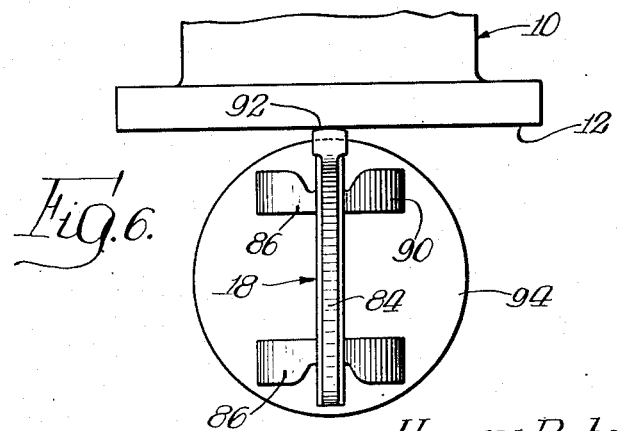
INVENTOR.
Henry Robert Billeter,
BY
Fidler, Crouse + Beardsley
Attys.

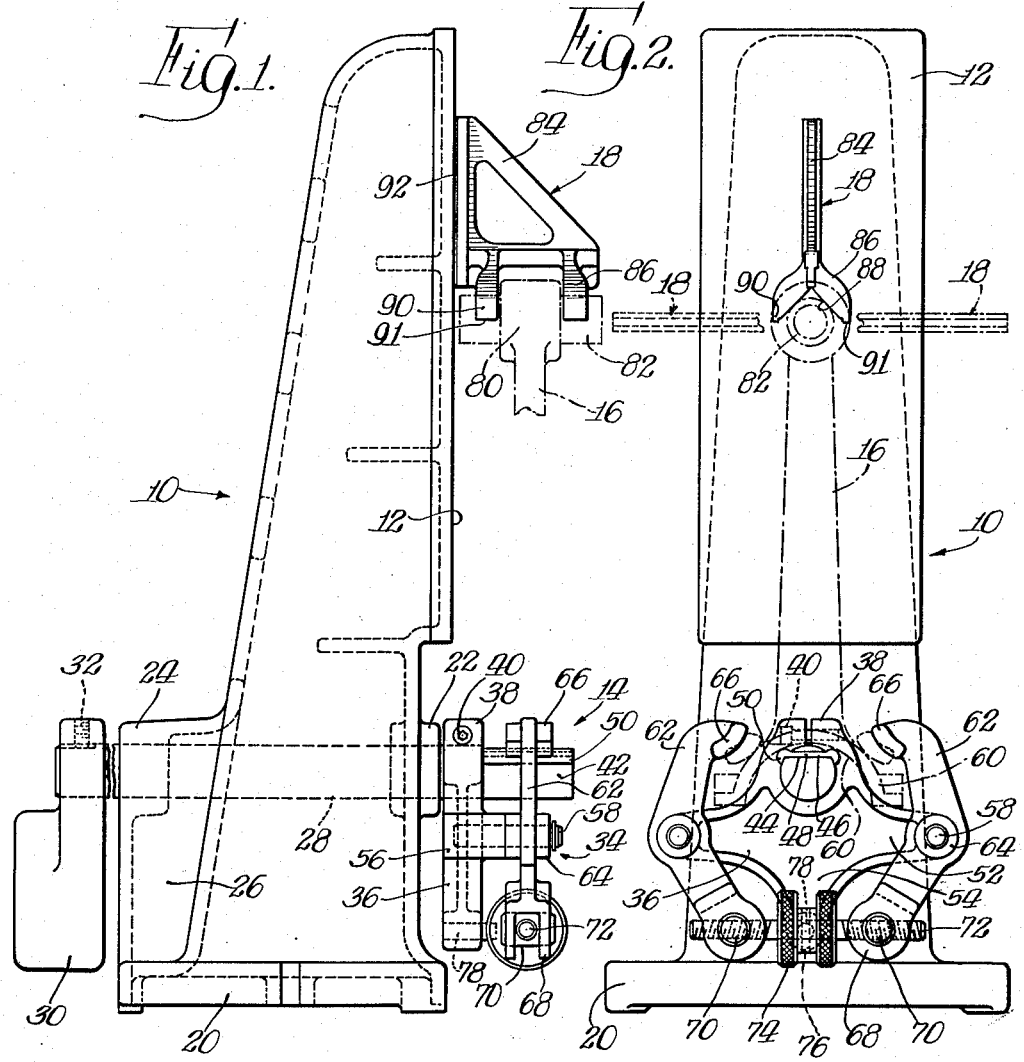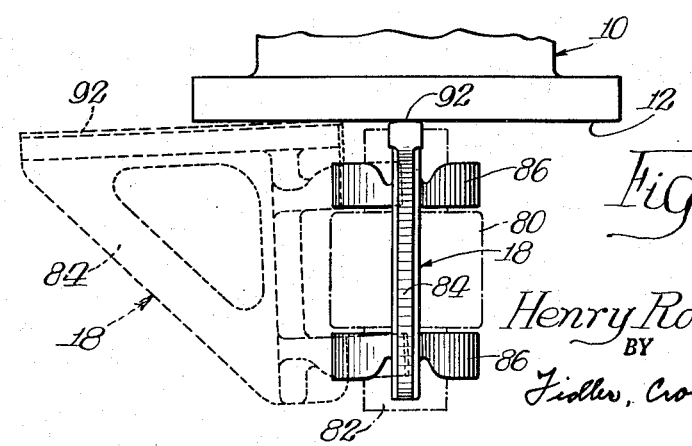

Jan. 5, 1954 H. R. BILLETER 2,664,643
CONNECTING ROD ALIGNMENT GAUGE
Filed June 20, 1952 3 Sheets-Sheet 3
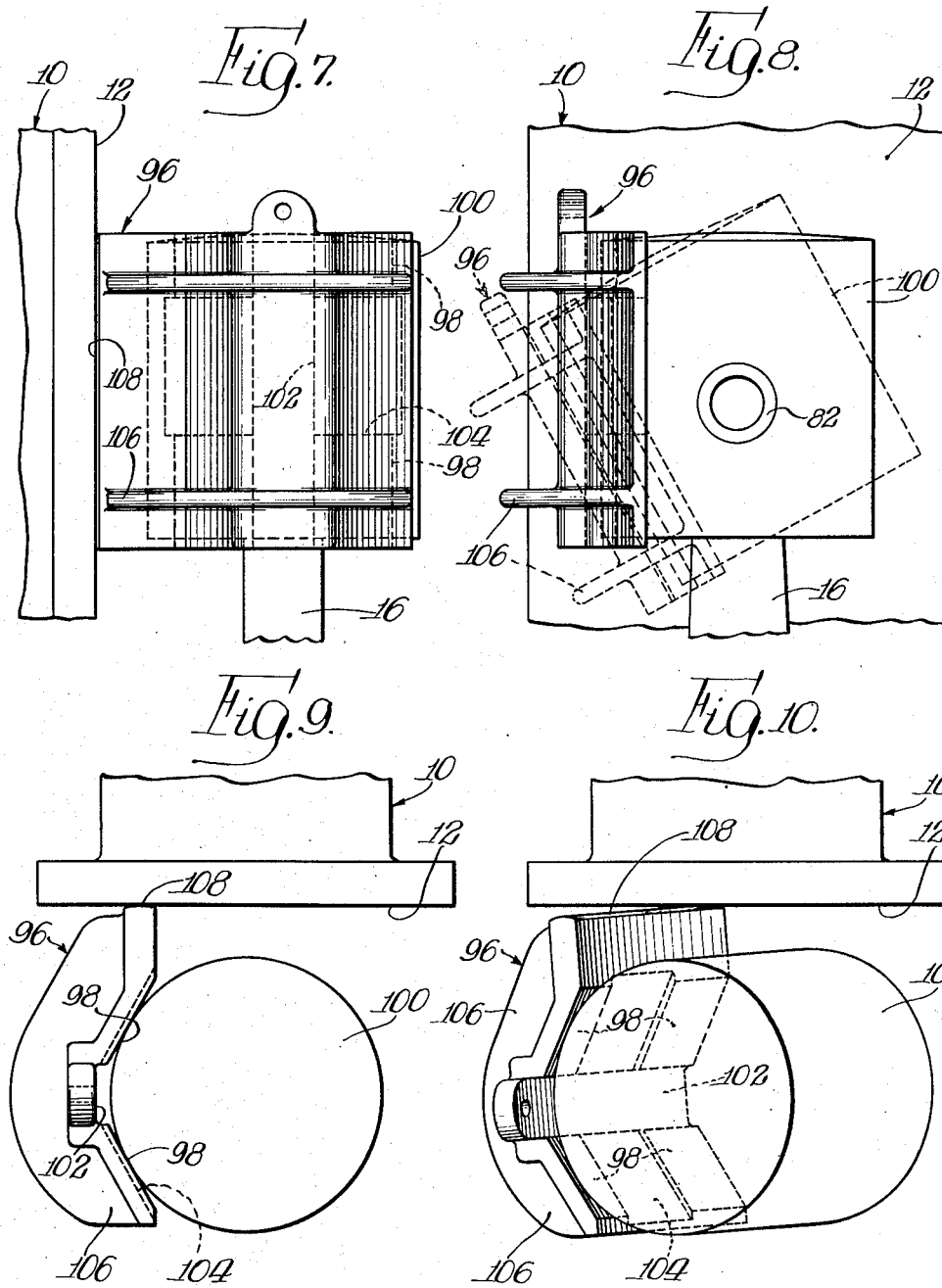
INVENTOR.
Henry Robert Billeter,
BY
Fidler, Crowe + Beardsley
Attys.

Patented Jan. 5, 1954

2,664,643

UNITED STATES PATENT OFFICE 2,664,643

CONNECTING ROD ALIGNMENT GAUGE

Henry Robert Billeter, Highland Park, Ill., assignor to Ammco Tools, Inc., North Chicago, Ill., a corporation of Illinois Application June 20, 1952, Serial No. 294,616

1 Claim. (Cl. 33—180)

This invention relates to alignment gauges for use in gauging the alignment of automotive engine connecting rods and has to do more particularly with a gauge for determining bend or twist distortion or disalignment of such connecting rods.

An object of the present invention is the provision of a connecting rod alignment gauge of such construction that the parts thereof will not readily become disaligned from wear due to usage, or from other causes and which therefore may be employed over a long period of use for accurately gauging connecting rod alignment.

Another object is the provision of an alignment gauge having novel equalizing clamping means for mounting any one of a large range of sizes of connecting rods accurately in position on the gauge.

A further object is the provision of an alignment gauge adapted for use in gauging the alignment of connecting rods of all sizes throughout a wide range without the necessity of employing adapters specially designed for various individual sizes of connecting rods.

A further object of the invention is the provision of a connecting rod alignment gauge having means for clamping therein a connecting rod either with the cap of the crank shaft bearing attached to the connecting rod or with the cap removed.

A still further object is the provision of a connecting rod alignment gauge having means for mounting a connecting rod thereon which is counterbalanced in such manner that even if wear occurs in such means the gauge will nevertheless accurately indicate bend or twist disalignment of the rod.

Another object is to provide a gauge enabling a user to perform a gauging operation on a work piece with rapidity.

A further and more specific object is to provide a gauge including a stand having an aligning surface, and means for mounting a connecting rod thereon, adapted for the use of any of a number of detached gauge blocks therewith, whereby the user is enabled to apply a gauge block to the work piece and the aligning surface and thereby perform the gauging operation with rapidity.

Another object is to provide an alignment gauge of the general character referred to, enabling the use of any of a plurality of detached gauge blocks therewith, and thereby enabling gauging connecting rods either with or without pistons mounted thereon, and gauging connecting rods with pistons of different shapes mounted thereon.

Other objects and advantages of the invention will become apparent upon reference to the following description taken in conjunction with the accompanying drawings in which:

Fig. 1 is a side elevational view of a connecting rod alignment gauge constructed in accordance with the present invention, together with a gauge block adapted for use therewith, and showing, in broken lines, a portion of a connecting rod, with a piston pin therein, in gauging position;

Fig. 2 is a front elevational view of the gauge and gauge block of Fig. 1 and showing, in broken lines, a connecting rod, with a piston pin therein, in position for gauging, and different gauging positions of the gauge block;

Fig. 3 is a partial plan view showing a portion of the gauge stand, the connecting rod and gauge block, and illustrating the gauge block in two gauging positions;

Fig. 4 is a partial side elevational view showing the gauge block of Figs. 1–3 applied to a piston on a connecting rod for gauging the latter;

Fig. 5 is a partial front elevational view of the arrangement of Fig. 4, showing two gauging positions of the piston and gauge block;

Fig. 6 is a partial plan view of the arrangement of Figs. 4 and 5;

Fig. 7 is a partial side elevational view showing a portion of the gauge stand, and a second form of gauge block applied to a piston on a connecting rod for gauging the latter;

Fig. 8 is a partial front elevational view of the arrangement of Fig. 7, showing two gauging positions of the piston and gauge block;

Fig. 9 is a partial plan view of the arrangement of Figs. 7 and 8; and

Fig. 10 is a partial plan view of the arrangement of Figs. 7 and 8, but showing a gauging position of the piston and gauge block different from that of Fig. 9.

The alignment gauge preferably is constructed so that it can be mounted on a bench or other convenient place for use by the operator. Before entering into a specific description of the details of the alignment gauge, a brief general statement of the main parts of the gauge is given. The gauge includes an upright stand 10 having an aligning surface 12, and mounting means 14 for mounting a connecting rod 16 in position with its upper end adjacent the surface 12, where a gauge block 18 is utilized, in conjunction with the surface 12, for gauging the alignment of the connecting rod.

The frame or stand 10 is preferably formed as an integral, one-piece structure, and may be a casting, having a base 20 for mounting on a bench or other support, and is of appropriate height and other dimensions for accommodating connecting rods such as are used in automobiles. Preferably the stand 10 is hollow in order to reduce its weight.

The aligning surface 12, as will be noted particularly from Fig. 2, is in the form of an unbroken plane surface of substantial height and width and is disposed substantially perpendicular to the under surface of the base 20 so that when the stand is set on a horizontal supporting surface the surface 12 will be disposed vertical. The aligning surface 12 is arranged on the front side of the stand and disposed adjacent the upper part thereof. The connecting rod when mounted by the mounting means 14, as will be described in detail later, is so positioned that its extended end will be adjacent the aligning surface 12 and, since the aligning surface is of substantial height, connecting rods of various lengths can readily be accommodated and because of the substantial width of the aligning surface the upper end of the connecting rod can be moved in a path parallel with the plane of the surface 12 for positioning the end of the connecting rod adjacent one side or the other of the surface for accommodating the gauge block 18 in different positions in a manner to be described in detail later.

The mounting means 14 is disposed below the aligning surface 12 and is mounted on an arbor 28 in such a way as to maintain the connecting rod in the desired position relative to the aligning surface so as to enable the user to accurately determine the aligning or disalignment of the connecting rod. The arbor 28 is rotatably and slidably mounted in bearings 22 and 24 in the stand, which are in accurate axial alignment along an axis perpendicular to the plane of the aligning surface 12. An extension 26 may be provided on the stand, if desired, in which one of the bearings is formed, in order to provide relatively wide spacing between the bearings and minimize the tendency of the arbor and thereby the mounting means 14 to become disaligned. The arbor is of substantial diameter so as to have sufficient strength to withstand bending or other distortion in mounting the connecting rod thereon. Fixedly mounted on the end of the arbor 28 opposite the mounting means 14 is a counterweight 30 secured by convenient means, such as a set screw 32, with its center of gravity eccentric to the axis of the arbor so that the counterweight will normally depend below the arbor. The counterweight 30 is of substantial weight so as to substantially counterbalance the weight of the connecting rod and the clamping means therefor, and thereby cause the arbor 28 to bear approximately equally on the lower surfaces of two bearings 22 and 24 when the connecting rod is mounted on the opposite end of the arbor. The counterweight is also effective for maintaining the connecting rod in generally vertical position when it is supported by the mounting means, against the tendency of the connecting rod to rock about the axis of the arbor and descend to downwardly extending position.

The mounting means 14 includes a connecting rod clamp 34 for engaging the portion of the crank shaft bearing on the connecting rod in mounting the latter in position. The clamp 34 includes a bracket 36 which may take the form of a casting having gripping jaws 38 generally similar to a split ring defining a circular opening for receiving the arbor 28. Convenient means, such as a clamp screw 40, is inserted through openings in the upper ends of the gripping jaws 38 and threaded into one of them for drawing the jaws together and thereby securing the bracket 36 to the arbor.

The bracket 36 is positioned inwardly from the extreme end of the arbor, as shown in Fig. 1, leaving a portion 42 of the arbor projecting outwardly beyond the bracket. This portion 42 is provided with spaced, arcuate, parallel bearing surfaces extending parallel to the arbor axis and adapted to receive the connecting rod thereon. Preferably the surfaces are of a wear-resisting nature. To this end the portion 42 is partially cut off along a chord defining a surface 44 perpendicular to a radius of the arbor on which an ear block 46 is mounted. The block 46 is suitably fixed to the surface as by silver brazing, and is of hard, wear-resistant material for engagement by the inner surface of the connecting rod bearing, whereby the block will remain accurately shaped in spite of the tendency of the bearing to wear it out of shape, and hence retain the connecting rod in properly aligned position. The block 46 includes a central flat portion 48 overlying the surface 44 and ears 50 having longitudinally extending convex surfaces formed on radii, the axes of which are parallel with the axis of the arbor and the ears extend laterally beyond the side edges of the surface 44 and consequently beyond the extension of the cylindrical surface of the portion 42 of the arbor. The ears 50 thus provide spaced bearing surfaces engaged by the inner surface of the crank shaft bearing of the connecting rod and are the sole supporting surfaces engaged by such inner surface, as will be more fully explained later.

The bracket 36 supports clamping means for clamping the connecting rod on the arbor, and for that purpose is preferably of the shape shown in Fig. 2 where it will be seen that it includes a pair of laterally extending arms 52 below the arbor and a downwardly extending portion 54. The outer ends of the arms 52 are provided with tubular portions 56 in which are mounted pins 58 extending outwardly therefrom parallel with the arbor.

The connecting rod 16 has the usual crank shaft bearing portion, one part 60 of which is integral with the rod proper and the other part (not shown) of which forms the cap. The portion 60 of the connecting rod is placed over the block 46 whereby the inner surface of the bearing engages the ears 50 at two circumferentially spaced points, retaining the connecting rod with the axis of the crank shaft bearing parallel with the axis of the arbor. Appropriate means is provided for clamping the bearing on the arbor and thereby clamping the connecting rod in position. The clamping means includes a pair of clamping jaws 62 having bearings 64 intermediate their lengths receiving the pins 58 on which the clamping jaws are pivoted. The upper ends of the clamping jaws are provided with convex clamping surfaces 66 adapted to engage the portion 60 of the connecting rod bearing upon adjustment of the clamping jaws in the appropriate manner as referred to below. For the purpose of adjusting the clamping jaws 62, the lower end of each clamping jaw has a forked formation 68 with aligned bearing openings in which is rockably mounted a short stud 70. A rotatable adjusting shaft 72 is threaded into threaded openings in the respective studs 70 transversely to the axes of the studs. Secured on the shaft 72 medially thereof is a knurled thumb nut 74 including axially spaced portions and a central hub, the hub and the shaft 72 having diametrical holes for insertion of a lock pin 76 for locking the nut to the shaft for rotation of the latter upon rotation of the nut for clamping adjustment of the clamping jaws. A guide pin 78 is mounted in the lower end of the portion 54 of the bracket 36 and extends between the portions of the knurled nut 74 for retaining the nut in centrally located position. Upon rotation of the nut 74 in one direction the lower ends of the clamping jaws 62 are forced outwardly with consequent inward movement of the upper ends thereof. The clamping surfaces 66 are brought into clamping engagement with the outer surface of the portion 60 at positions adjacent the ears 50, and the clamping force of the surfaces is directed substantially toward the center of the arbor. Upon rotation of the nut in the opposite direction, the clamping jaws are moved in the opposite direction for releasing the connecting rod bearing.

As is well known, an automobile connecting rod such as 16 includes not only the crank shaft bearing, one portion of which is shown at 60 as referred to above, but also a bearing 80 for receiving a piston pin 82 upon which the piston is mounted. The connecting rod can be mounted on the mounting means 14 with or without the cap secured to the counterpart portion 60 of the bearing. This feature facilitates gauging the connecting rod since it is not necessary for the operator to either remove the cap or attach it to the connecting rod in order to perform the gauging operation. The connecting rod is positioned with the bearing portion 60 engaging the ears 50, and the clamping jaws 62 are then tightened against the bearing portion by suitable actuation of the thumb nut 74 to clamp the bearing portion between the clamping surfaces 66 and the ears 50. The combined weight of the clamp 34 and the counterweight 30 is greater than that of the connecting rod and piston pin, and hence the connecting rod will tend to be maintained in a generally upright position but it can of course be readily rocked about the axis of the arbor and moved to and held in other positions since the arbor 28 is rotatable in the support 10. It will be understood that when the connecting rod is in upright position the upper or piston pin end is closely adjacent the aligning surface 12 and within the projection of the confines of the latter.

The gauge block 18 is then applied to the piston pin 82 and in conjunction with the aligning surface 12 the alignment or disalignment of the connecting rod can readily be determined by visual observation. The gauge block 18 may be in the form of a casting and, as here shown, is roughly triangular in form, and includes an upper body portion 84 which preferably is of generally flat shape. For purposes of convenience in later referring to the relation between the gauge block and other elements, the flat body portion may be considered as having a "body plane," i. e., a vertical plane that would be viewed on edge in Fig. 2. The gauge block also includes spaced and aligned foot portions 86 each having V-shaped surfaces 88, the spacing of the foot portions being such that they can be conveniently placed on opposite sides of the bearing 80, with the V-shaped surfaces 88 engaging respective end portions of the piston pin 82. Each of the foot portions 86 includes laterally spaced toe portions 90, and the under surfaces 91 of all of the four toe portions lie in a common plane, parallel with the line of alignment between the foot portions, for engagement with the top flat surface of a piston when a connecting rod with a piston attached is to be engaged, as will be later described. Disposed at right angles to the plane of the surfaces 91 and to the line of alignment between the foot portions 86 is a gauging surface 92, of substantial length, for contacting the aligning surface 12 on the stand for determining the alignment or disalignment of the connecting rod. Preferably the surface 92 is slightly arcuate in cross section (Fig. 3) so as to facilitate determination of contact engagement with the aligning surface 12, in certain cases where the gauge block is disposed at an angle to the surface 12, i. e., the body plane of the gauge block forms an angle with the plane of the aligning surface.

The arbor 28 may be slid in the bearings 22, 24 so as to bring the bearing 80 and pin 82 closely adjacent the aligning surface 12, if it is not already in such position. When the connecting rod is thus positioned, as shown in Fig. 1, the gauge block 18 is applied, in upright position (Figs. 1 and 2), to the connecting rod by positioning the foot portions 86 in straddling relation to the bearing 80 and the respective toe portions 90 straddling the piston pin 82. The connecting rod, with the gauge block thus applied, is then moved toward the aligning surface 12 (by sliding the arbor 28) to any extent as may be necessary to bring the gauging surface 92 into engagement with the aligning surface 12.

If the connecting rod is true and not disaligned, the gauging surface 92 will have uniform contact engagement with the aligning surface 12 throughout the length of the former, as will be obvious from the well-known nature of the connecting rod, and the relation between the parts of the alignment gauge as above described. This condition can be quickly and easily observed by visual inspection by the operator.

If the connecting rod should be bent, i. e., bent in the plane containing the axis of the bearing 80 and the axis of the crank shaft bearing 60, the piston pin would be disposed at an angle to the perpendicular to the plane of the aligning surface 12; in such case, when the gauge block is applied in upright position (Figs. 1 and 2), space will appear between the surfaces 92 and 12 and engagement between those surfaces would be only at one or the other of the ends of the surface 92.

In some cases, the connecting rod may be twisted, i. e., twisted about the longitudinal axis of the connecting rod. If this condition should exist, the piston pin 82 would be displaced from its true position although it may remain in the same horizontal plane as when in true position, i. e., a plane perpendicular to the longitudinal direction of the connecting rod. In such case, the piston pin would form an angle to the perpendicular to the surface 12, but if it remains in the same horizontal plane, as mentioned, the gauge block when in upright position (Figs. 1 and 2) would not indicate any disalignment. In this circumstance the gauge block is applied in a horizontal position such as shown in broken lines in Figs. 2 and 3. Since, due to the twist, the piston pin would be disposed at an angle to the perpendicular to the surface 12, a similar angular relationship would occur between the surfaces 92 and 12 (Fig. 3). While Figs. 2 and 3 illustrate the upper end of the connecting rod adjacent the center portion of the aligning surface 12, it will be understood that the connecting rod can be rocked in one direction or the other to bring the bearing 80 and piston pin 82 toward one side of the aligning surface so as to provide sufficient space for the gauge block to fall substantially within the confines of the aligning surface. The operation will not be affected by such positioning of the connecting rod, since the gauge block may be disposed at the desired angle relative to the longitudinal direction of the connecting rod regardless of the position of the latter. Figs. 2 and 3 illustrate the gauge block extending somewhat beyond the lateral edge of the aligning surface, but this is simply for the purpose of showing the relation between the two positions of the gauge block with respect to the connecting rod.

Figs. 4, 5 and 6 illustrate the use of the gauge block 18 in the operation of gauging a connecting rod having the piston attached thereto. The connecting rod 16 in the present instance includes a piston 94 with a flat top surface mounted on the piston pin 82. As mentioned above, the toe portions 90 have their under surfaces 91 all lying in a common plane and as a result they can conveniently be brought into contact with the top surface of the piston. In gauging the connecting rod when the piston is attached thereto, the connecting rod is brought into the desired position relative to the aligning surface 12 in a manner described above in connection with Figs. 1-3. The gauge block 18 is then put in position as shown in Fig. 4 and the gauging surface 92 brought into contact engagement with the aligning surface 12. The determination of the existence of alignment or disalignment is observed in precisely the manner as above described, namely, if the surfaces 92 and 12 are in full and uniform engagement throughout the length of the former, no bent condition exists in the connecting rod, i. e., the connecting rod is not bent in the plane containing the axis of the piston pin and the axis of the crank shaft bearing.

In the use of the gauge block in connection with a piston, the arcuate contour of the gauging surface 92 becomes effective. Normally the user would apply the gauge block in such position that its body plane is substantially perpendicular to the plane of the surface 12. However, he need not take special assurance that such position is maintained but may position it at a slight angle to the perpendicular to that surface, and so long as the piston is maintained in centered position, or longitudinally aligned position, relative to the connecting rod, the gauge block in cooperation with the aligning surface 12 will indicate any alignment or disalignment with respect to a bent condition of the character referred to. For example, if the gauge block should be disposed so that a slight angle is formed between its body plane and the plane of the surface 12, there would be essentially only line contact between the surfaces 92 and 12, and the user could easily detect alignment or disalignment, whereas if the surface 92 were of plane form, the user may experience a sensation than an accurate indication would not result unless such plane surface were brought into full contact engagement with the surface 12, and to bring about the desired relation would be time consuming. However, such accurate positioning is not required when an arcuate gauging surface, such as here shown at 92, is used.

The gauge and gauge block may also be utilized for determining whether twist distortion exists in the connecting rod when the piston is attached to the connecting rod. Fig. 5 illustrates in dot-dash lines the gauge block applied to the upper end surface of the piston. If the connecting rod is twisted the piston pin will be disposed at an angle to the perpendicular to the aligning surface 12 and although it may remain in the same horizontal plane as when in true position, the piston when tipped at an angle, as shown in Fig. 5, will be so positioned that its upper surface will be out of the perpendicular to the aligning surface 12. In such a case when the gauge block is applied to the piston, as shown in Fig. 5, and the gauging surface 92 brought into contact with the surface 12 there will be a space between the two surfaces and engagement only at one or the other of the ends of the surface 92.

Figs. 7–10 illustrate the use of the alignment gauge of the invention in connection with another form of gauge block. The present gauge block may be used in gauging a connecting rod when the piston is attached thereto, and is especially adaptable to use in the case of a piston that does not have a flat upper surface. Certain kinds of pistons are provided with, for example, curved upper surfaces, as illustrated in Figs. 7 and 8, and in such cases the gauge block 18, illustrated in Figs. 4–6 may not accurately indicate disalignment of the connecting rod for the reason that if the gauge block is not accurately applied to the piston it may indicate disalignment when none exists.

The gauge block 96 is particularly adaptable to pistons of the foregoing type and is of such character that it can be applied to the cylindrical wall of the piston in the gauging operation. The gauge block 96 has a shallow, generally concave side with surfaces 98 arranged in the form of a V for engaging the cylindrical wall surface of the piston 100. The V surfaces 98 may be separated by longitudinal groove 102 and may be longitudinally divided, as indicated at 104, for forming longitudinally spaced surface elements for engaging respective portions of the piston spaced axially therealong. Pistons may also be of non-uniform diameter in different portions thereof and in such case the longitudinally spaced surfaces 98 of the gauge block may be of different depths and other dimensions to accommodate the respective portions of different diameters of the piston. The gauge block may also be provided with suitable reinforcing ribs 106. As in the case of the previous gauge block, the present gauge block 96 is provided with a gauging surface 108 similar in all material respects to the gauging surface 92; that is, it may be slightly arcuate in cross section and it is of substantial length so as to be capable of engaging the surface 12 throughout a substantial length for ease in determining alignment or disalignment of the connecting rod.

In the use of the gauge block 96 the connecting rod is moved to the desired position, as described in connection with Fig. 1, to position the piston at the appropriate distance from the aligning surface 12 of the stand 10. In one case, for example, the piston is held in centered position relative to the connecting rod, i. e., longitudinally coaxial position. If the connecting rod is not bent in the plane containing the axis of the piston pin and the axis of the crank shaft bearing, the gauging surface 108 will be in uniform contact with the gauging surface 12 throughout the length of the former, but if a bent condition does exist, there will be engagement between the surfaces 108 and 12 at only one or the other of the ends of the former.

For the purpose of determining whether twist distortion is present in the connecting rod, of such character that the piston pin may, for example, remain in the same horizontal plane as when in true position, as was explained above, the piston is rocked on the connecting rod to the position illustrated in dot-dash lines in Fig. 8. In the event that a twist condition does exist, any longitudinal line element of the piston will be disposed at an angle to the plane of the surface 12, and such angular disalignment will be indicated by a corresponding angular relation between the surfaces 108 and 12 as indicated in Fig. 10. Thus the alignment gauge is adaptable to the use of a gauge block 96 of the type adapted for application to the cylindrical wall surface of the piston.

An alignment gauge is thus provided enabling the use of a detached gauge block which can be applied in gauging position by a simple movement of the hand, and moreover the gauge block can be quickly applied in different positions for gauging different kinds of distortion (e. g. bend and twist). There is no need for making time consuming adjustment settings of any of the parts of the gauge during the course of the gauging operation—the only setting necessary consisting of mounting the connecting rod on the device. The connecting rod can be easily and quickly moved by a simple hand manipulation for placing it in proper position relative to the aligning surface and for placing it so as to conveniently and properly position the gauge block relative to the connecting rod and to the aligning surface.

It will be seen from the foregoing that the present invention provides a connecting rod alignment gauge which is simple and rugged and in which the means for supporting the connecting rod to be gauged is accurately and rigidly maintained in proper position, and in which the construction is such that the elements of the device remain in proper relative position over a long period of use and do not become disaligned readily due to wear or other causes. The frame or support is formed by a single member and therefore is not only rigid but is not as subject to manufacturing or assembling inaccuracies or loosening and consequent disalignment of the several parts of the frame as in the case of frames formed from a plurality of members. The gauge is of such construction that all of the parts may be made strong and rugged and they are so assembled that they are not likely to be readily disaligned by reason of rough usage. Accordingly, the gauge need not be used with extreme care and delicacy and is not likely to become inaccurate even though subjected to comparatively rough usage.

The stand being of unitary construction and having both the vertical aligning surface formed thereon and the bearings for the rod-carrying arbor formed therein, it is comparatively simple to accurately manufacture the gauge. The face of the aligning surface on the stand may be readily formed accurately in perpendicular relation to the axis of the arbor which is mounted in the bearings in the stand or support.

The invention further provides a very simple but sturdy and accurate means for supporting the connecting rod in proper position for accurate gauging or verification of the alignment of the connecting rod and any associated members as, for example, the piston pin or the piston pin and piston. The supporting means includes a clamping arrangement which is quick and easy to manipulate and which is substantially foolproof in that it automatically positions the connecting rod on the supporting arbor without requiring any preliminary setting or adjustment. That is to say, merely placing the connecting rod on the arbor and manipulating the adjusting thumb screw will insure that the connecting rod is accurately positioned in relation to the supporting arbor.

Because of the clamping action of the clamping jaws directly on the portion of the crank shaft bearing which is integral with the rod proper, the connecting rod may be clamped to the arbor either with the cap forming the counterpart of the integral portion attached or with the cap removed. In many previous devices the connecting rod is mounted by means of an internal mounting means having radially outwardly extending elements engaging the inner surface of the bearing, which devices require that the cap of the bearing be replaced. Considerable time is thus saved by the device of the present invention in mounting the connecting rod for gauging.

In the clamping operation in which the surfaces of the clamping jaws engage the connecting rod bearing, these surfaces are located closely adjacent the ears and the direction of their force is substantially toward the center or axis of the arbor. By reason of this relationship an equalizing effect in the clamping action is produced regardless of the size of the crank shaft bearing portion of the connecting rod. Furthermore, there is substantially no tendency of the clamping force to "cock" or distort the bearing in its relation to the arbor. In other words, it is not necessary that the connecting rod be initially placed on the arbor in exact position in order that it be securely and accurately clamped. Any wear that may occur in the clamping jaws will not affect the accurate mounting of the connecting rod, since the connecting rod is retained in accurate position by the wear-resistant ears.

It is unnecessary in the device of the present invention to utilize special adapters for the various sizes of connecting rod bearings. The clamping jaws and ears are effective for accurately securing the bearing portions of connecting rods of all sizes throughout a wide range of sizes. The clamping jaws are spaced only a short distance from the bracket—a distance in the present instance substantially equal to the diameter of the arbor, thereby eliminating any bending of the arbor that the clamping action tends to cause.

It will be seen from the foregoing that any wear in the clamp does not affect the accuracy of the device as the connecting rod is automatically positioned properly with respect to the axis of the arbor. It will be noted that wear on the supporting ears would affect the accuracy of the positioning of the connecting rod, but since these ears are, in accordance with the invention, made of wear-resisting material, any inaccuracy due to such wear will not occur throughout a long period of years.

As previously pointed out hereinabove, the gauge of the present invention may be used for determining disalignment of connecting rods throughout a long range of sizes. In fact, the gauge illustrated in the drawings is capable of determining disalignment of all current sizes of connecting rods employed in passenger automobiles from the smallest to the largest. Obviously the invention is not limited to a particular size and arrangement of gauge herein shown but the principles of the invention may be incorporated in connecting rod alignment gauges capable of use with larger sizes of connecting rods, as for example those employed in truck engines and other internal combustion engines.

It will also be remembered that it was pointed out hereinabove that the gauge of the present invention may be employed in determining disalignment of connecting rods both where the cap portion of the crank shaft bearing has been removed from the connecting rod proper and where such cap portion has been reassembled with the connecting rod after removal from the engine. Moreover, the gauge is adapted for use with a connecting rod having only the piston pin assembled therewith or where the piston pin and piston both are assembled with the connecting rod.

The connecting rod is mounted on an arbor which is free to both slide and rotate and therefore the positioning of the connecting rod for placement of the gauge block in gauging relation therewith is greatly facilitated. Moreover, the fact that the arbor is free to rotate permits the operator to move the connecting rod readily for enabling the gauge block to be applied in different positions.

The provision of the counterweight on the arbor insures that the arbor will bear substantially equally on both of its bearings, thereby equalizing the action wear on the bearings. Accordingly, as wear occurs in the bearings from long continued use of the gauge, the arbor nevertheless is supported in true perpendicular relationship with respect to the aligning surface. Moreover, the presence of the counterweight insures that the arbor will be supported in the bearings in the aforesaid perpendicular relationship even though such wear of the bearings as above mentioned has taken place. Accordingly, there is no tendency for the bearings to wear one at the bottom and the other at the top with consequent angular displacement or "cocking" of the arbor. Also such cocking will not occur when the connecting rod is supported on the arbor even though the bearings have worn in their bottom portions.

I claim:

A connecting rod alignment gauge comprising a stand, an arbor mounted in said stand and having one end extended laterally therebeyond, the extended end of said arbor having a cut-off portion forming a chord surface and having a hard wear-resisting element secured on said chord surface with ears projecting laterally beyond the side edges of said chord surface, said extended end being adapted for mounting a connecting rod thereon in such position that the connecting rod bearing at least partially surrounds the arbor and engages said ears, and means including clamp jaws operably mounted on said arbor for clamping the bearing between themselves and the arbor and arranged for exerting force on the bearing at points adjacent said ears and in directions substantially toward the central axis of the arbor, the connecting rod when so mounted extending from the arbor, with its extended end adjacent the stand.

HENRY ROBERT BILLETER.

References Cited in the file of this patent
UNITED STATES PATENTS

| Number | Name | Date |
|---|---|---|
| 1,375,237 | Spencer | Apr. 19, 1921 |
| 1,565,695 | Webster | Dec. 15, 1925 |
| 1,575,797 | Shaw | Mar. 9, 1926 |
| 1,576,594 | Froussard | Mar. 16, 1926 |
| 1,616,053 | Kylin | Feb. 1, 1927 |
| 1,672,159 | Imlach | June 5, 1928 |
| 1,684,321 | Holton | Sept. 11, 1928 |